(12) United States Patent
Traywick et al.

(10) Patent No.: US 12,375,929 B2
(45) Date of Patent: Jul. 29, 2025

(54) GEOLOCATION AUTHENTICATOR

(71) Applicant: Bank of America Corporation, Charlotte, NC (US)

(72) Inventors: Edward Lee Traywick, Bellbrook, OH (US); Barry Walsh, Greystones (IE); Joshua Johnson, Denver, NC (US); Christopher Stephen Littrell, Dallas, TX (US); Christopher D. Nobile, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 248 days.

(21) Appl. No.: 18/093,546

(22) Filed: Jan. 5, 2023

(65) Prior Publication Data
US 2024/0236687 A1 Jul. 11, 2024

(51) Int. Cl.
*H04W 12/63* (2021.01)
*H04W 12/06* (2021.01)

(52) U.S. Cl.
CPC .......... *H04W 12/63* (2021.01); *H04W 12/06* (2013.01)

(58) Field of Classification Search
CPC . H04W 12/63; H04W 12/06; G10H 2220/355
See application file for complete search history.

(56) References Cited

U.S. PATENT DOCUMENTS

| | | | |
|---|---|---|---|
| 6,665,715 B1 | 12/2003 | Houri | |
| 8,838,748 B2* | 9/2014 | Nair | H04L 65/612 709/219 |
| 9,473,510 B2* | 10/2016 | Pearce | H04W 12/08 |
| 10,063,565 B2* | 8/2018 | VoBa | G06F 21/64 |
| 10,206,099 B1* | 2/2019 | Trinh | H04W 4/021 |

(Continued)

OTHER PUBLICATIONS

Everything You Need to Know About IP Geolocation Databases [on-line] Geo Targetly; [retrieved on Nov. 28, 2022]; Retrieved from the Internet: <URL: https://geotargetly.com/ip-geolocation-databases#:~:text-What%20is%20an%20IP%20Geolocation,of%20a%20particular%20IP%20address.html>.

(Continued)

*Primary Examiner* — Mohammad A Siddiqi
(74) *Attorney, Agent, or Firm* — Banner & Witcoff, Ltd.

(57) ABSTRACT

Aspects of the disclosure are directed to a supporting authentication between a computing platform and a computer that has an attached geolocation dongle. The attached geolocation dongle provides location information to the computer that is indicative of a current location of the computer, where the location information is obtained from RF signals generated from neighboring cell towers or the Global Positioning System. The computing platform may utilize the location information for authenticating the computer. Moreover, the location information may be encrypted by the geolocation dongle based on an encryption key known by the geolocation dongle and the computing platform. With another aspect, authentication is supported by a computer and an associated communication device that provides location information to the computer via a short-range communication channel. With another aspect, authentication is supported by a computer and an associated communication device that provides location information directly to the computing platform.

20 Claims, 15 Drawing Sheets

(56) References Cited

U.S. PATENT DOCUMENTS

| | | | |
|---|---|---|---|
| 10,397,347 B2* | 8/2019 | Kundu | H04L 47/82 |
| 2004/0192332 A1 | 9/2004 | Samn | |
| 2005/0213716 A1 | 9/2005 | Zhu et al. | |
| 2006/0206568 A1 | 9/2006 | Verma et al. | |
| 2007/0104183 A1 | 5/2007 | Bakke et al. | |
| 2009/0006677 A1* | 1/2009 | Rofougaran | G01S 19/35 |
| | | | 710/63 |
| 2011/0105151 A1 | 5/2011 | Hall | |
| 2012/0016696 A1 | 1/2012 | Lee | |
| 2012/0127975 A1* | 5/2012 | Yang | H04W 76/19 |
| | | | 370/338 |
| 2013/0072221 A1 | 3/2013 | Chen et al. | |
| 2015/0057022 A1* | 2/2015 | Burckart | H04W 4/02 |
| | | | 455/456.3 |
| 2015/0189547 A1* | 7/2015 | Forssell | H04W 48/06 |
| | | | 370/235 |
| 2015/0201298 A1 | 7/2015 | Zhang et al. | |
| 2015/0281167 A1 | 10/2015 | Seddon | |
| 2016/0072797 A1* | 3/2016 | Wilson | H04L 63/107 |
| | | | 726/9 |
| 2016/0174124 A1* | 6/2016 | Basu Mallick | H04W 74/0833 |
| | | | 370/331 |
| 2017/0118613 A1* | 4/2017 | Sundel | H04W 4/90 |
| 2017/0366641 A1* | 12/2017 | Fultz | H04L 67/306 |
| 2018/0056936 A1* | 3/2018 | Parasurama | E05B 81/56 |
| 2018/0103019 A1* | 4/2018 | Chen | H04L 63/0492 |
| 2018/0164399 A1* | 6/2018 | Reunamaki | G01S 3/043 |
| 2018/0332016 A1* | 11/2018 | Pandey | H04L 63/0428 |
| 2019/0021067 A1 | 1/2019 | Huang | |
| 2019/0034602 A1 | 1/2019 | Votaw et al. | |
| 2019/0289017 A1* | 9/2019 | Agarwal | H04L 9/0643 |
| 2020/0091724 A1* | 3/2020 | Freni | G06F 1/16 |
| 2021/0343154 A1* | 11/2021 | Faccin | G08G 5/0069 |
| 2022/0131871 A1* | 4/2022 | Huang | G06F 16/22 |
| 2022/0159535 A1* | 5/2022 | Rahman | H04W 12/062 |
| 2022/0165146 A1* | 5/2022 | Daoura | H04W 8/005 |
| 2023/0013034 A1* | 1/2023 | Tertinek | G07C 9/00309 |
| 2023/0042460 A1* | 2/2023 | Zhang | G06F 1/1698 |
| 2023/0184922 A1* | 6/2023 | Nickel | E01F 9/553 |
| 2023/0413189 A1* | 12/2023 | Wang | H04W 72/0453 |
| 2024/0007293 A1* | 1/2024 | Farhady Ghalaty | |
| | | | G06Q 10/1095 |
| 2024/0062867 A1* | 2/2024 | Lim | G06F 1/3265 |
| 2024/0212407 A1* | 6/2024 | Baker | G07C 9/28 |
| 2024/0298240 A1* | 9/2024 | Jain | H04W 76/10 |

OTHER PUBLICATIONS

Evan Schuman; Geolocation Great for Authentication, but Far from Perfect [on-line]; Sift Science, Inc. 2022; [retrieved on Nov. 28, 2022]; Retrieved from the Internet: <URL: https://blog.sift.com/geolocation-nice-tool-authentication-far-perfect/>.

GPS Spoofing—DataVisor Digital Fraud Wiki [on-line]; Datavisor, Inc.; 2022; [retrieved on Nov. 28, 2022]; Retrieved from the Internet: <URL: https://www.datavisor.com/wiki/gps-spoofing/.

Cell ID Finder; How to find the Cell Id location with MCC, MNC, LAC and CellID (CID); [on-line]; Apr. 22, 2015; [retrieved on Nov. 28, 2022]; Retrieved from the Internet: <URL: https://cellidfinder.com/articles/how-to-find-cellid-location-with-mcc-mnc-lac-i-cellid-cid.

Mark Gill; How to Use Geo-Spoofing to Change Your Location Online; [on-line]; Jul. 27, 2022; [retrieved on Nov. 28, 2022]; Retrieved from the Internet: <URL: https://www.comparitech.com/blog/vpn-privacy/geospoofing/.

Amanda Barnhart; Easy TechJunkie; What Are the Different Ways to Track Cell Phones; [on-line]; Nov. 9, 2022; [retrieved on Nov. 28, 2022]; Retrieved from the Internet: <URL: https://www.easytechjunkie.com/what-are-the-different-ways-to-track-cell-phones.htm.

* cited by examiner

GEOLOCATION AUTHENTICATOR

BACKGROUND

Authentication is often important to enable an organization to maintain a secure network by permitting only authenticated users to processes or to gain access to resources (for example, computer systems, databases, and websites) of the network. The authentication procedure may depend upon a number of parameters including the location of a user. For example, one leading financial institution recently added geolocation to certain credit cards to assist with authentication. The premise is that when the customer's phone is on and the customer has opted-in for geolocation, the financial institution can validate whether a transaction is legitimate.

However, while geolocation is a very effective, it is a limited tool to help authenticate a transaction. For example, online geolocation often deals with the IP address of a user, which may be wrong for various reasons, such as when the shopper is using a Virtual Private Network (VPN). Also, some browsers (such as Tor) may attempt to hide IP address. While for a vast majority of the time online geolocation works well, there are instances where geolocation is inadequate or even misleading.

SUMMARY

Aspects of the disclosure are directed to a supporting authentication between a computing platform and a computer that has an attached geolocation dongle. The attached geolocation dongle provides location information that is indicative of a current location of the computer, where the location information is obtained from RF signals from neighboring cell towers or the Global Positioning System. The computing platform can utilize the location information for authenticating the computer.

With one aspect of the embodiments, the location information may be encrypted by the geolocation dongle based on an encryption key known by the geolocation dongle and the computing platform.

With another aspect of the embodiments, authentication is supported by a computer and an associated communication device that provides location information to the computer via a short-range communication channel such as a Bluetooth channel.

With another aspect of the embodiments, authentication is supported by a computer in concert with an associated communication device that provides location information directly to the computing platform.

With another aspect of the embodiments, a geolocation dongle is electrically attachable to a computer to enable the computer to support authentication during a communication session with a computing platform. The geolocation dongle comprises at least one processor, a data interface communicatively coupled to the at least one processor to interact with the computer, a radio frequency (RF) monitoring circuit configured to monitor at least one RF signal and to provide processed information derived from the at least one RF signal, a cryptographic engine configured to encrypt unencrypted information based on an encryption key known at the computing platform and the geolocation dongle, and a memory device storing computer-readable instructions. When the geolocation dongle receives a request for authentication metadata from the computer through the data interface, the geolocation dongle obtains the processed information from the RF monitoring circuit, derives location information from the processed information, wherein the location information is indicative of a current location of the geolocation dongle and the computer, presents the location information to the cryptographic engine to obtain encrypted location information, and presents the encrypted location information to the computer through the data interface.

With another aspect of the embodiments, an RF monitoring circuit of the geolocation dongle comprises an RF scanning device. The geolocation dongle determines, through the RF scanning device, a nearest cell site (cell tower) to the computer based on at least one RF signal, where each of the at least one RF signals is generated by a cell site, determines the location information of the nearest cell site, and approximates the current location of the geolocation dongle and the attached computer from the location information of the nearest cell site.

With another aspect of the embodiments, the geolocation dongle identifies the nearest cell site from a strongest RF signal, extracts a cell identification (ID) from the strongest RF signal, and identifies location information from the cell ID.

With another aspect of the embodiments, the RF monitoring circuit comprises a Global Positioning System (GPS) receiver. The geolocation dongle obtains location information from the GPS receiver, where the location information comprises longitudinal and latitudinal information about the geolocation dongle and the attached computer.

With another aspect of the embodiments, a geolocation dongle comprises a location selection circuit and an RF monitoring circuit, where the RF monitoring circuit comprises a GPS receiver and an RF scanning circuit. The location selection circuit obtains location information from the GPS receiver when available. Otherwise, the location selection circuit obtains the location information from the RF scanning circuit.

With another aspect of the embodiments, location information is provided to a computer by an associated communication device through a short-range communication channel.

With another aspect of the embodiments, a computer in concert with an associated communication device having GPS capabilities supports authentication with a computing platform. The associated communication device executes an authenticator app and provides GPS location directly to the computing platform.

With another aspect of the embodiments, a computing platform, when authenticating a computer, compares a derived location based on the IP address of the computer with the location information provided by a communication device associated with the computer. If there is a sufficiently large discrepancy, the computing platform may interact with the user of the computer to resolve the discrepancy.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
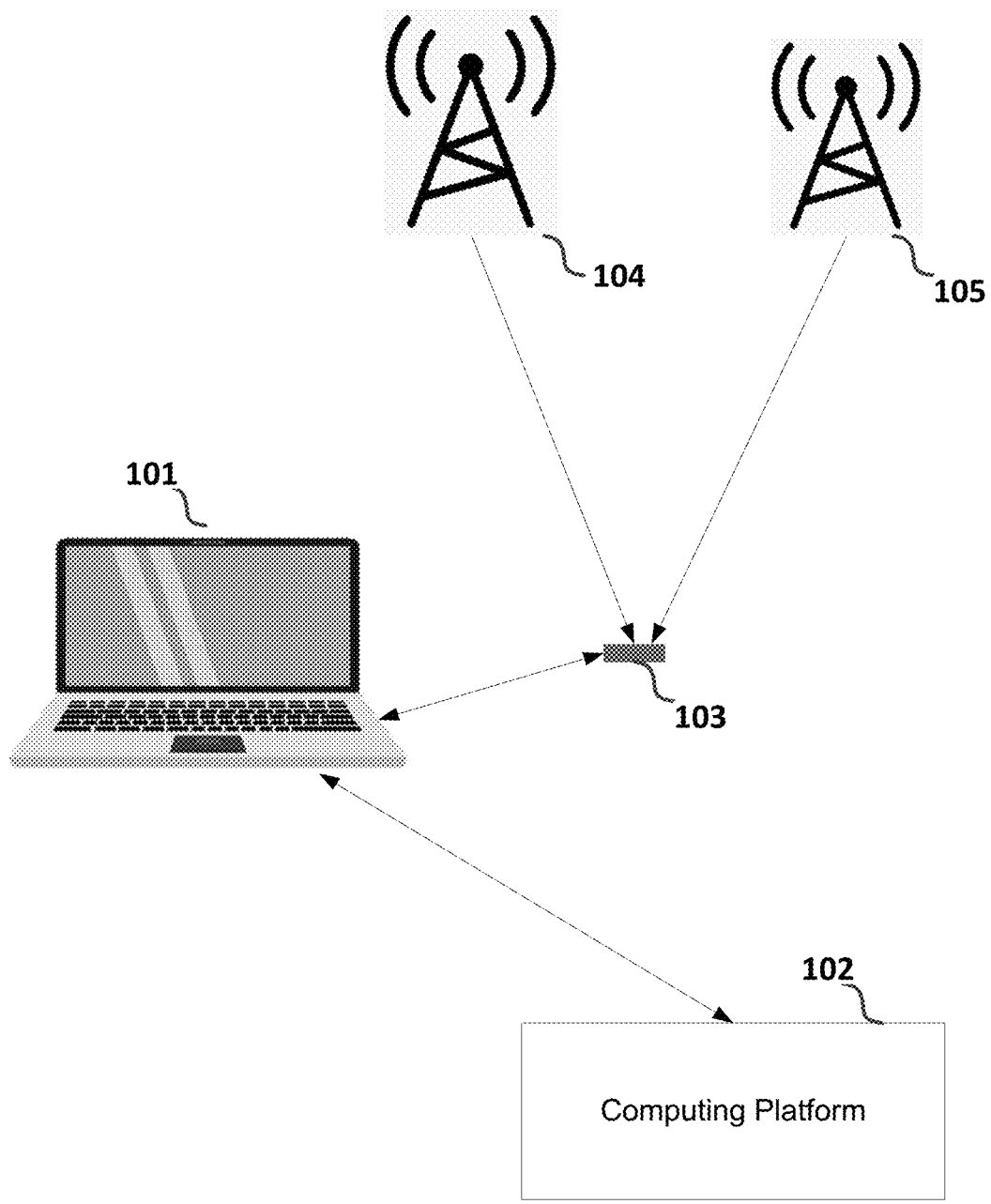
FIG. 1 depicts an illustrative computing environment for supporting authentication in accordance with one or more example embodiments.

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

With one aspect of the embodiments, authentication is supported between a computing platform and a computer in concert with an attached geolocation dongle. The attached geolocation dongle provides location information that is indicative of a current location of the computer, where the location information from RF signals are obtained from neighboring cell towers or the Global Positioning System. The computing platform may utilize the location information for authenticating the computer. Moreover, the location information may be encrypted by the geolocation dongle based on an encryption key known by the geolocation dongle and the computing platform.

Alternatively, authentication is supported by a computer in concert with an associated communication device that provides location information to the computer or to a computing platform.

These and other features are described in further detail below.

Throughout the following discussion, it is assumed that a computing platform knows a known approximate location (for example, city or region) where a user (and consequently the user's computer) should be when the user interacts with the computing platform. If the user is sufficient distant from the known approximate location (for example, in Madrid, Spain rather than Chicago, Illinois), the computing platform may perform security measures to obtain further information or to terminate the session with the user. However, if location information from a user's computer is within a predetermined distance of the known approximate location, the location information is deemed to be consistent with the known approximate location.

Throughout the following discussion, it is presumed that the location of a geolocation dongle is essentially the same as that of an attached computer (for example, through a USB connector on the computer).

Throughout the following discussion, it is presumed that the location of a nearest cell site (cell tower) and the location of a computer are the same for the purpose of authenticating the computer by a computing platform.

Throughout the following discussion, it is presumed that a computer and associated communication device are at an essentially same location. This assumption may be further assured by requiring that the computer and the associated communication device interact only via a short-range communication channel.

FIG. 1 depicts an illustrative computing environment for supporting authentication, where a user at computer 101 is interacting with computing platform 102 during a communication session (for example, executing a transaction).

In order to validate the session, computing platform 102 challenges the user to authenticate the session. The user may provide an authentication token or one-time password (OTP) (which may be obtained by the user via some means such as through another device not explicitly shown) as well as computing platform 102 obtaining authentication metadata from computer 101.

Authentication metadata often comprises discovered information (often implicit or hidden) about a computing device such as computer 101 that may be used to identify a particular computing device associated with a user. Examples of authentication metadata include, but are not limited to, browser history information, device characteristics of the user's computing device, and/or the location of the user's computing device.

Traditional approaches often derive the location of a computing device from the IP address assigned to the computing device. For example, an accessed geolocation database may map IP addresses to different locations that are often characterized by a latitude and longitude. With this traditional approach, a computing platform may look up an IP address assigned to a user's computer. However, there may be a number of deficiencies with this approach. For example, the user's computer may use a virtual private network, which typically replaces the actual IP address with another IP address corresponding to the VPN server. Consequently, the location of the user's computer appears to be at the location of the VPN servers. Moreover, a user may purposely spoof the IP address by creating a false IP address.

With an aspect of the embodiments, computer 101 provides location information to computing platform 102 by deriving the location information from available radio frequency (RF) signals available at computer 101. With some embodiments, the location information may not be precise within feet but may be sufficient to determine whether computer 101 is located in a particular city or region. The location information, in concert with other authentication metadata, may then be used by computing platform 102 to assist computing platform 102 in authenticating computer 101.

With the embodiment shown in FIG. 1, computer 101 obtains location information provided by geolocation dongle 103, which is attached to computer 101, for example, through a USB connector (not explicitly shown).

Geolocation dongle 103 determines location information from RF signals generated by neighboring cell sites 104 and 105 (which may be referred to as cell towers 104 and 105) as will be discussed in greater detail.

Figure 2:
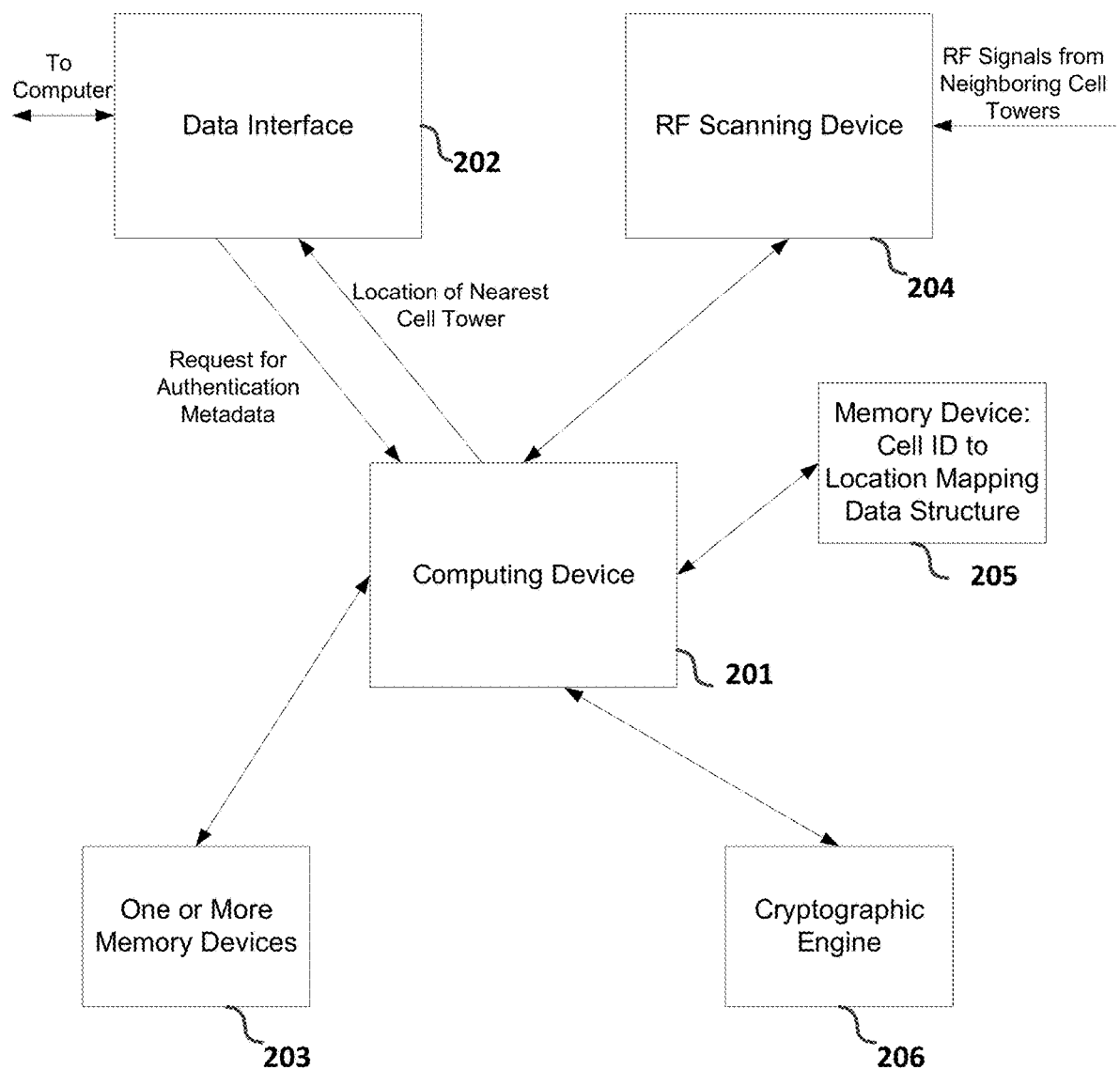
FIG. 2 depicts a geolocation dongle for supporting the computing environment shown in FIG. 1 in accordance with one or more example embodiments.

FIG. 2 depicts geolocation dongle 103 as shown in FIG. 1, where geolocation dongle 103 presents location information to computer 101 through data interface 202. Computer 101 subsequently sends the location information with other authentication metadata to computing platform 102 in order to authenticate the user's computer 101.

Computing device 201 may obtain computer-readable instructions from memory device 203, which supports a computer-readable media. Computer-readable media may be any available media that may be accessed by computing device 201 and may include both volatile and nonvolatile media, removable and non-removable media. By way of example, and not limitation, computer-readable media may comprise a combination of computer storage media and communication media.

Computer storage media may include volatile and nonvolatile, removable and non-removable media implemented in any method or technology for storage of information such as computer readable instructions, data structures, program modules or other data. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by the computing device.

Communication media typically embodies computer-readable instructions, data structures, program modules or other data in a modulated data signal such as a carrier wave or other transport mechanism and includes any information delivery media. Modulated data signal is a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Geolocation dongle 103 comprises RF scanning device 204 to receive RF signals generated from cell towers 104 and 105 as well as other RF signals generated by other neighboring cell towers not explicitly shown in FIG. 1. RF scanning device 204 and computing device 201 process the received RF signals to extract location information of geolocation dongle 103 (and consequently of attached computer 101). The neighboring cell towers may be located at various distances from geolocation dongle 103, for example, hundreds of feet to miles.

With some embodiments, the received RF signals may convey the corresponding cell identifications of the cell sites generating the RF signals. Geolocation dongle 103 comprises memory device 205 containing a data structure (for example, a database) that maps the cell ID to location of the corresponding cell tower/cell site. However, some embodiments may utilize an external database that is accessible by geolocation dongle 103.

With some embodiments, geolocation dongle 103 may utilize location information conveyed in the RF signals generated by cell towers 104 and 105 rather than the cell ID.

With some embodiments, computing device 201 selects the RF signal having the strongest signal strength to identify the nearest cell tower as will be discussed in greater detail. However, some embodiments may utilize location information.

With some embodiments, geolocation dongle 103 utilizes cryptographic engine 206 to encrypt the location information derived from the RF signals, where the encryption key is known only by geolocation dongle 103 and computing platform 102. This approach provides a degree of protection from location spoofing by the user of computer 101. With this approach, computer 101 obtains the location information in encrypted form and provides the encrypted location information to computing platform 102. With some embodiments, the encryption key may be static or dynamic. For example, to provide a dynamic key, the key may be derived from a pseudo-random sequence that is advanced each time geolocation dongle 103 is queried by computer 101.

Embodiments may implement cryptographic engine 206 in a number of ways. For example, geolocation dongle 103 may utilize a specialized integrated circuit or computing device 201 may execute computer-readable instructions provided by memory device 203 to encrypt the location information.

Figure 3:
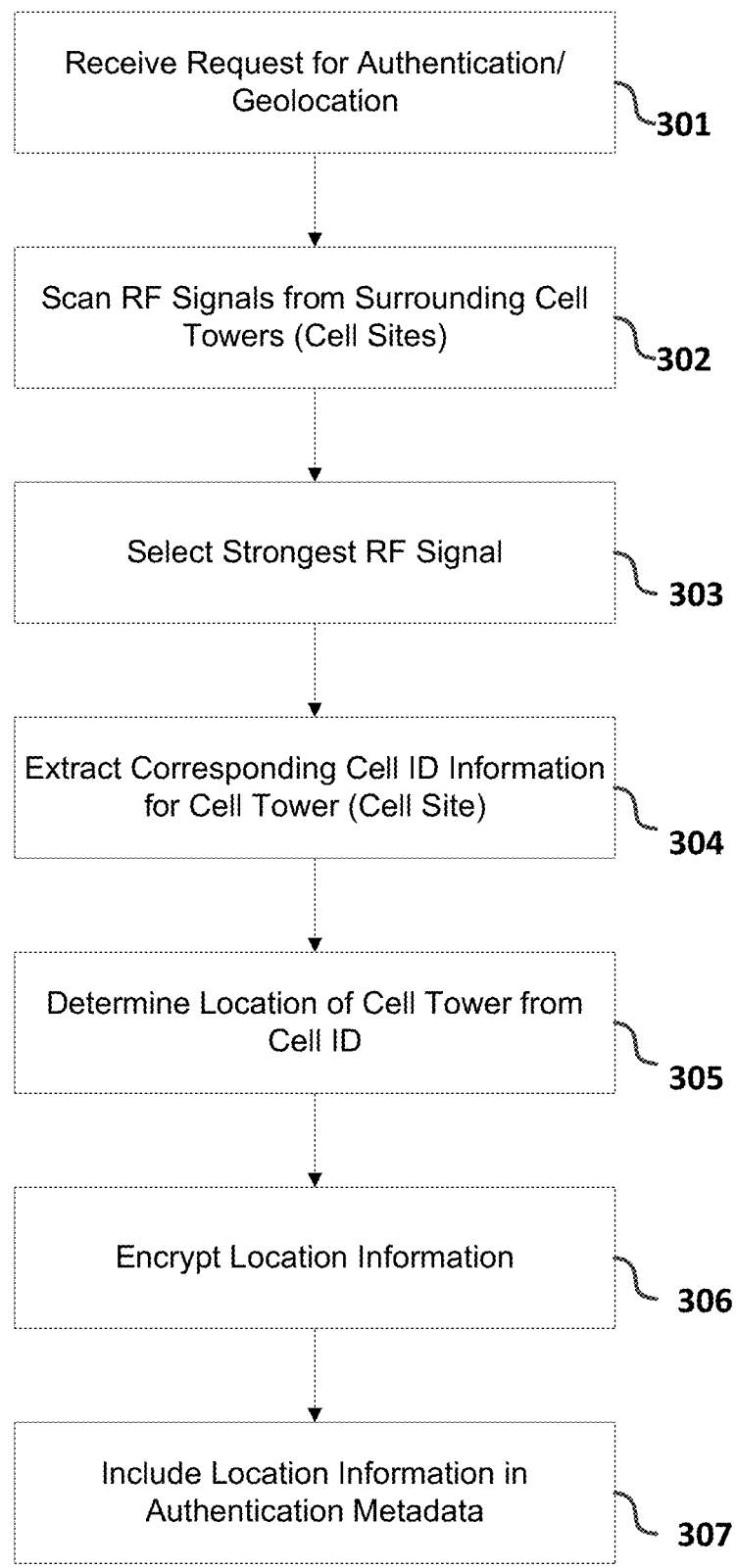
FIG. 3 depicts a flowchart for supporting authentication by the computing environment shown in FIG. 1 in accordance with one or more example embodiments.

FIG. 3 depicts a flowchart for supporting authentication by the computing environment that includes computer 101 and geolocation dongle 103 shown in FIG. 1.

At block 301, geolocation dongle 103 receives a request of geolocation information from computer 101 so that computer 101 can include the location information in authentication metadata to computing platform 102. Consequently, at block 302 geolocation dongle 103 scans RF signals from surrounding cell towers.

Geolocation dongle 103 selects the strongest RF signal at block 303 to identify the nearest cell tower and extracts the cell ID from the selected RF signal at block 304. At block 305 geolocation dongle 103 determines the location of the identified cell tower from a data structure mapping the cell ID to the cell location. This location is then used to approximate the location of computer 101.

As previously discussed, geolocation dongle 103 may encrypt the location information at block 306 to prevent location spoofing.

At block 307 computer 101 obtains the location information from geolocation dongle 103 and includes the location information in authentication metadata to computing platform 102.

Figure 4:
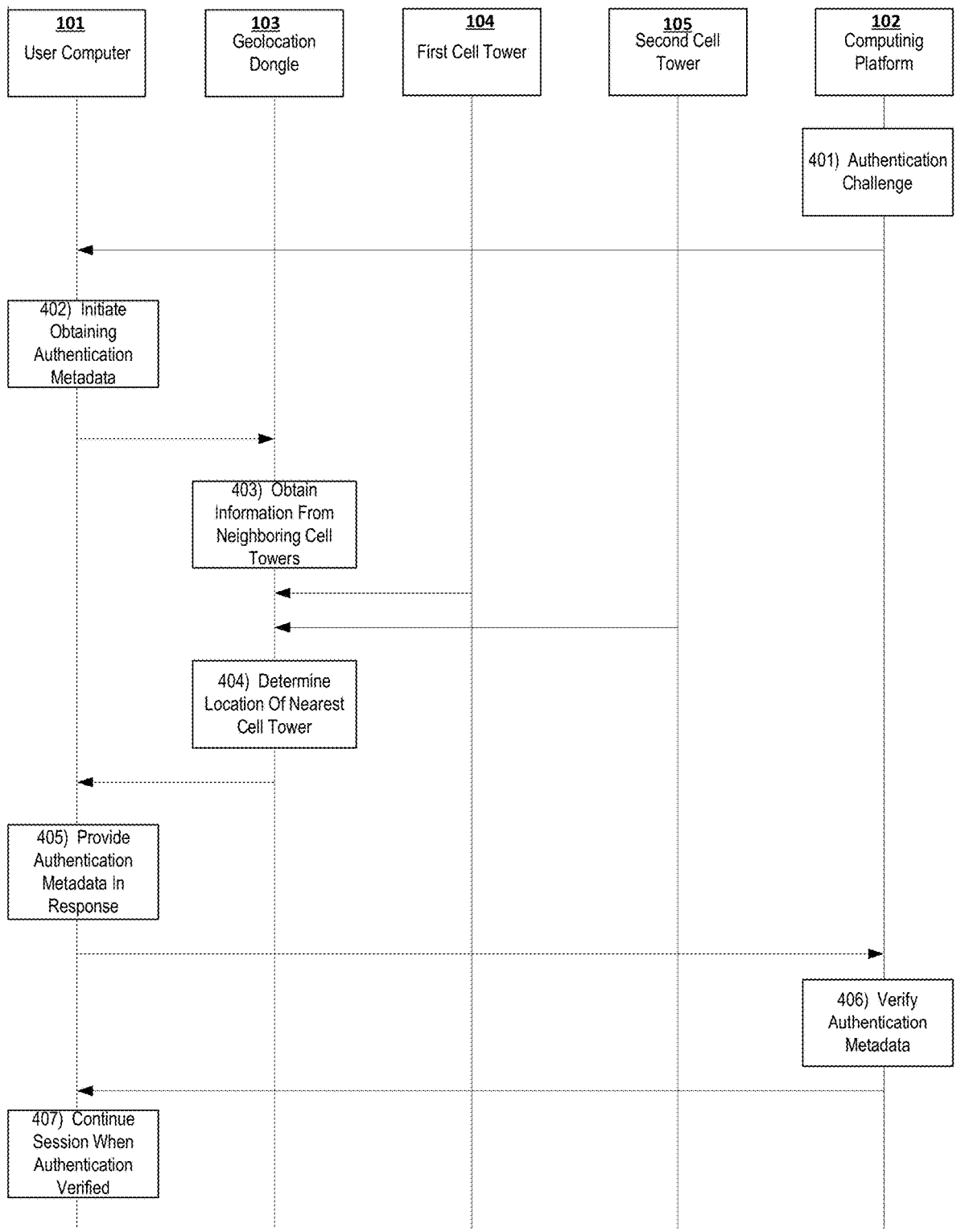
FIG. 4 depicts an illustrative event sequence for supporting authentication by the computing environment shown in FIG. 1 in accordance with one or more example embodiments.

FIG. 4 depicts an illustrative event sequence for supporting authentication by the computing environment shown in FIG. 1. At block 401, computing platform 102 challenges computer 101. To successfully respond to the challenge, computer 101 must provide authentication metadata, including the location information, to computing platform 102.

At block 402 computer 101 initiates obtaining authentication metadata by requesting attached geolocation dongle 103 to provide the location information. However, If geolocation dongle 103 is not attached, computer 101 is unable to obtain the location information and consequently authentication may not be successful.

In order to provide the location information, geolocation dongle 103 extracts information from RF signals generated by surrounding cell towers at block 403. At block 404 geolocation dongle 103 determines the location of the nearest cell tower based on the strongest RF signal and provides the determined location information to computer 101.

At block 405 computer 101 provides the authentication metadata, including the location information, to computing platform 102. If computing platform 102 deems that the authentication metadata is valid at block 406, computer 101 is allowed to continue interacting with computing platform 102 during the communication session.

Figure 5:
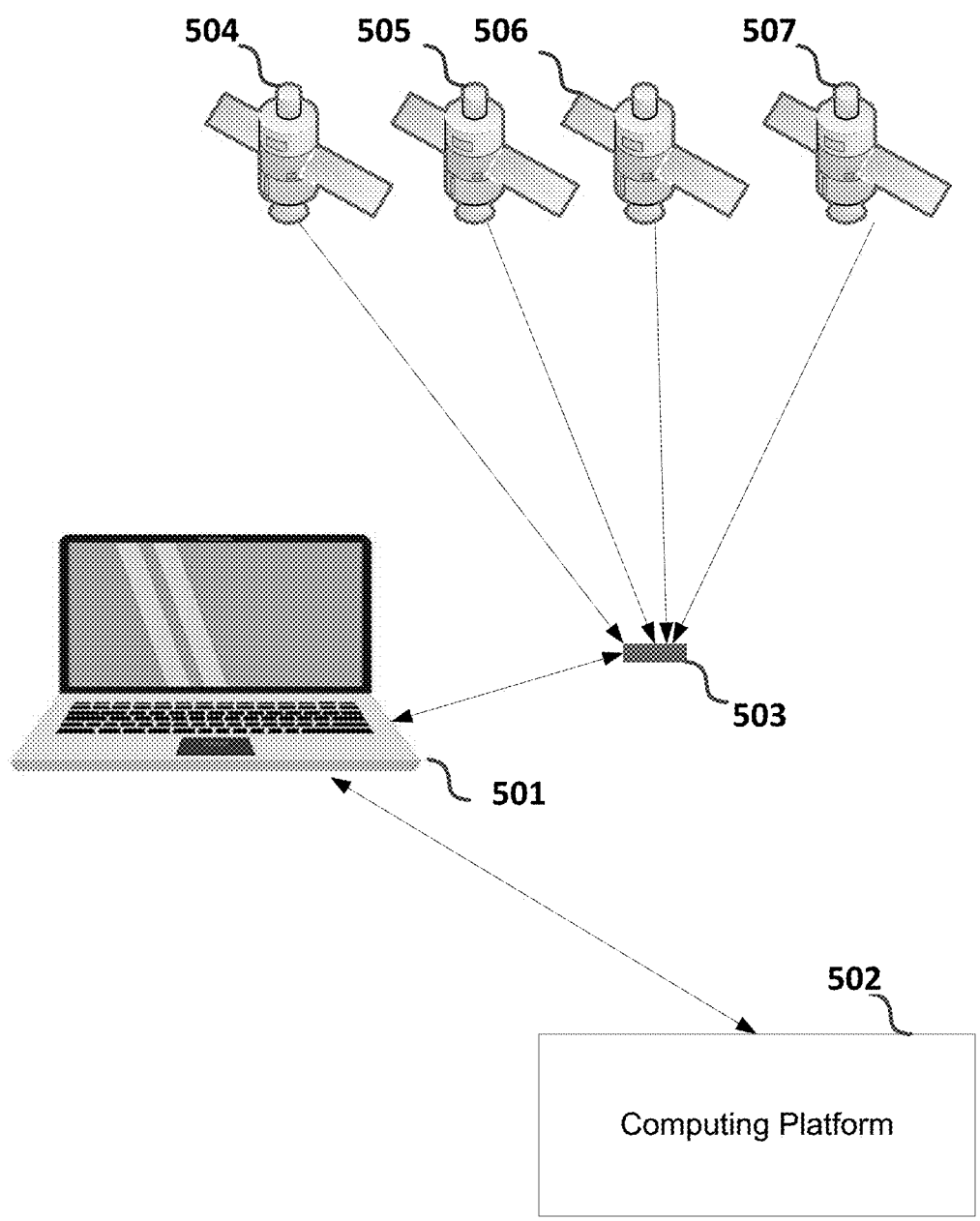
FIG. 5 depicts an illustrative computing environment for supporting authentication in accordance with one or more example embodiments.

FIG. 5 depicts an illustrative computing environment for supporting authentication, where a user at computer 501 is interacting with computing platform 502 during a communication session (for example, executing a transaction). The computing environment is similar to the computing environment shown in FIG. 1, where computer 501, computing platform 502, geolocation dongle 503 corresponds to computer 101, computing platform 102, and geolocation dongle 103, respectively. However, geolocation dongle 503 determines location information based on GPS signals from Global Positioning System (GPS) satellites 504-507 rather than from RF signals generated by surrounding cell towers. Generally, the precision provided by GPS is greater than that provided by surrounding cell towers. However, because authentication often requires the identification of the city or region where a computing device may be, the additional precision is often not required.

Figure 6:
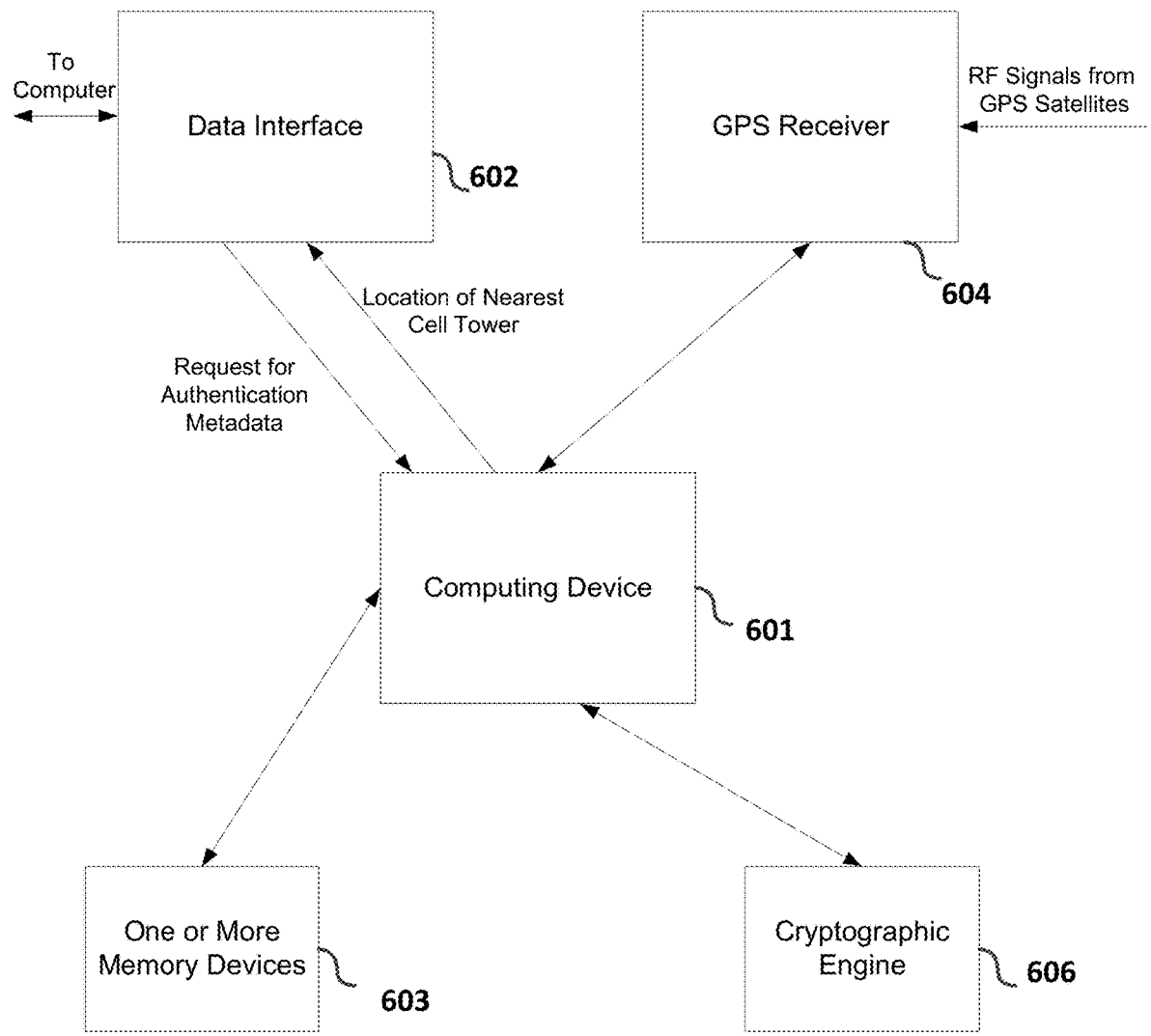
FIG. 6 depicts a geolocation dongle for supporting the computing environment shown in FIG. 5 in accordance with one or more example embodiments.

FIG. 6 depicts geolocation dongle 503 for supporting the computing environment shown in FIG. 5. Geolocation dongle 503 is similar with geolocation dongle 103 shown in FIG. 2, where computing device 601, data interface 602, memory device 603, GPS receiver 604, and cryptographic engine 606 correspond to computing device 201, data interface 202, memory device 203, RF scanning circuit 204, and cryptographic engine 206, respectively. However, GPS receiver 604 typically provides location information (such as latitude, longitude, and altitude) without further processing by geolocation dongle 503. For example, GPS receiver 604 may provide an output in standard National Marine Electronics Association (NMEA) string format. GPS receiver 604 may provide the output serially with the NMEA string output containing different parameters separated by commas such as longitude, latitude, altitude, and time.

Figure 7:
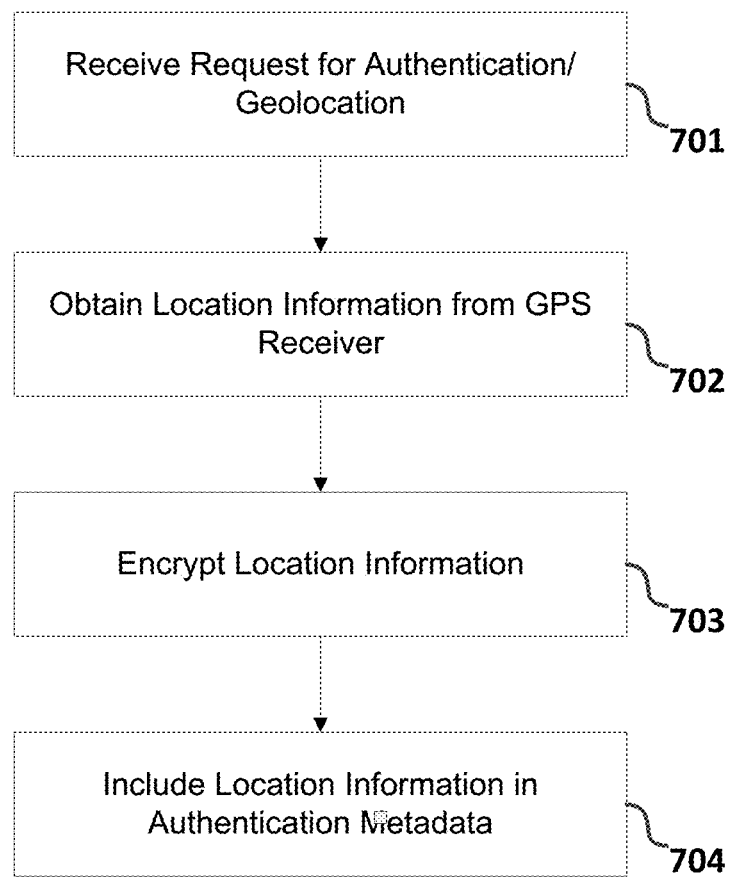
FIG. 7 depicts a flowchart for supporting authentication by the computing environment shown in FIG. 5 in accordance with one or more example embodiments.

FIG. 7 depicts a flowchart for supporting authentication by the computing environment shown in FIG. 5. At block 701, geolocation dongle 503 receives a request of geolocation information from computer 501 so that computer 501 can include the location information in authentication metadata to computing platform 502. Consequently, at block 702 geolocation dongle 503 scans RF signals from a required number of GPS satellites.

Geolocation dongle 503 may encrypt the location information at block 703 to prevent location spoofing.

At block 704 computer 501 obtains the location information from geolocation dongle 503 and includes the location information in the authentication metadata to computing platform 502.

Figure 8:
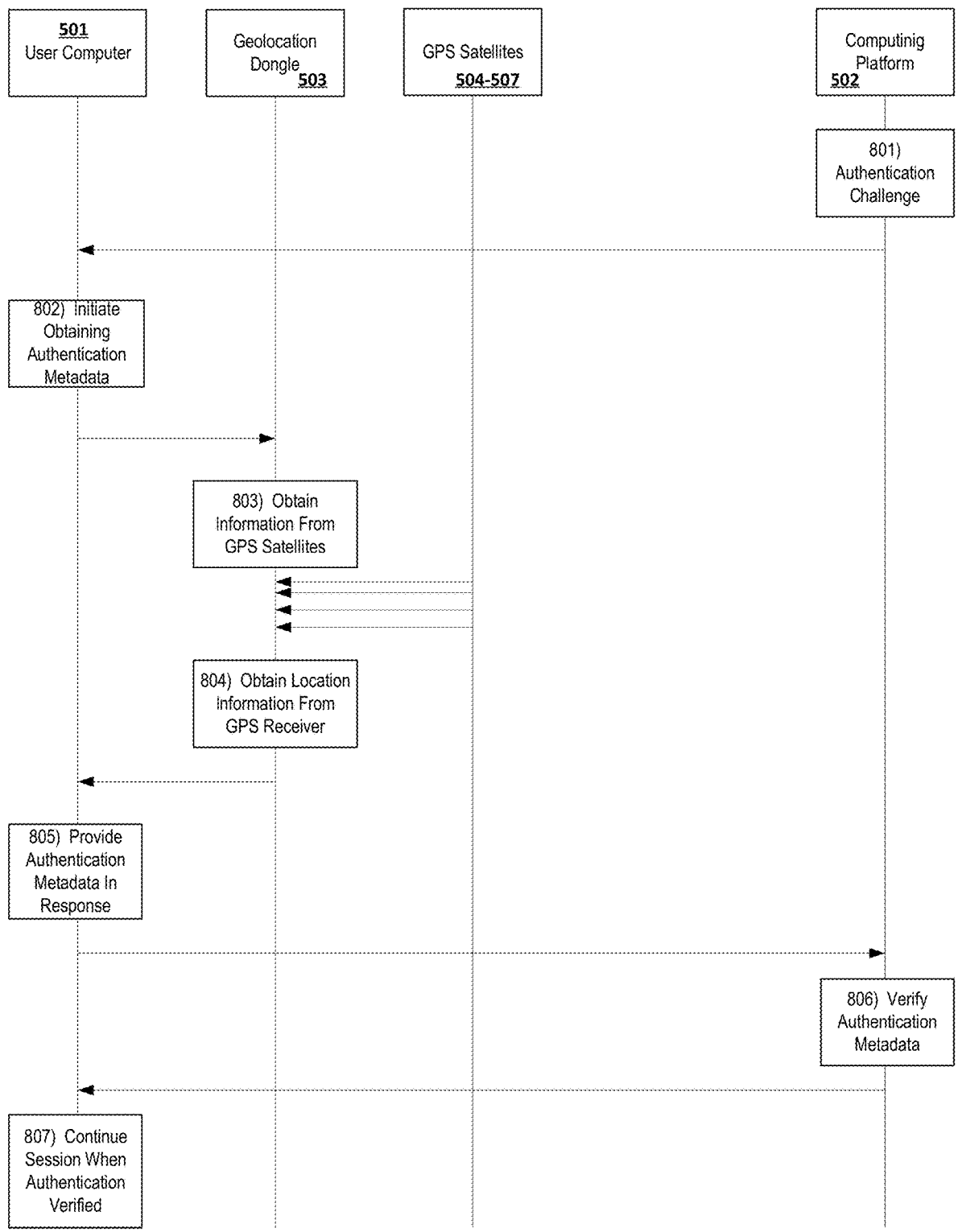
FIG. 8 depicts an illustrative event sequence for supporting authentication by the computing environment shown in FIG. 5 in accordance with one or more example embodiments.

FIG. 8 depicts an illustrative event sequence for supporting authentication by the computing environment shown in FIG. 5.

At block 801, computing platform 502 challenges computer 501. To successfully respond to the challenge, computer 501 must provide authentication metadata, including the location information, to computing platform 502.

At block 802 computer 501 initiates obtaining authentication metadata by requesting attached geolocation dongle 503 to provide the location information. However, If geolocation dongle 503 is not attached, computer 501 is unable to obtain the location information and consequently authentication may not be successful.

In order to provide the location information, geolocation dongle 503 extracts information from RF signals generated by the Global Positioning System at block 803 (typically from four GPS satellites). At block 804 geolocation dongle 503 obtains the location information provided by GPS receiver 603 (as shown in FIG. 6) and provides the GPS location information to computer 101.

At block 805 computer 501 provides the authentication metadata, including the location information, to computing platform 502. If computing platform 502 deems that the authentication metadata is valid at block 806, computer 501 is allowed to continue interacting with computing platform 502 during the communication session.

Figure 9:
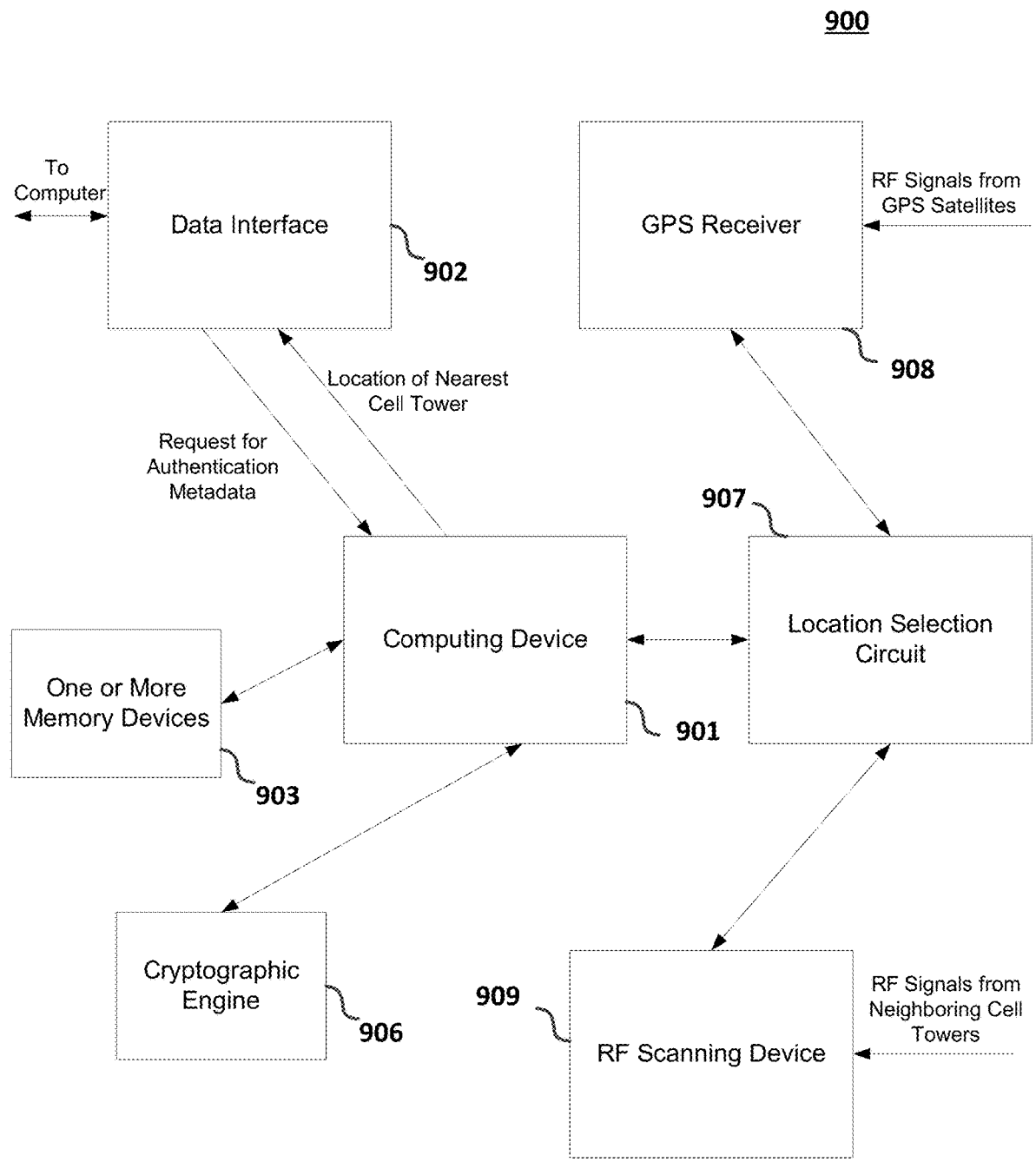
FIG. 9 depicts a geolocation dongle that selects location information obtained from neighboring cell towers or a Global Positioning System in accordance with one or more example embodiments.

FIG. 9 depicts geolocation dongle 900 that selects location information from neighboring cell towers or a Global Positioning System in accordance with one or more example embodiments. This approach addresses situations where GPS signals from the necessary number of satellites are not available, for example, in the interior of an office building.

Geolocation dongle 900 is similar with geolocation dongles 103 and 503 shown in FIGS. 2 and 5, where computing device 901, data interface 902, memory device 903, and cryptographic engine 906 correspond to computing devices 201 and 501, data interfaces 202 and 502, memory device 203 and 503, and cryptographic engines 206 and 506, respectively. However, geolocation dongle 900 contains both GPS receiver 908 and RF Scanning Circuit 909 so that RF signals from the Global Positioning System and from surrounding cell towers can be selected by location selection circuit 907 and provided to computing device 901.

With some embodiments, geolocation dongle 900 prefers location information derived from the Global Positioning System. However, if GPS location information is not available, geolocation dongle 900 reverts to location information derived from surrounding cell towers. Consequently, if RF signals from the Global Positioning System and surrounding cell towers are available, selection circuit 907 will select location information from GPS receiver 908.

Figure 10:
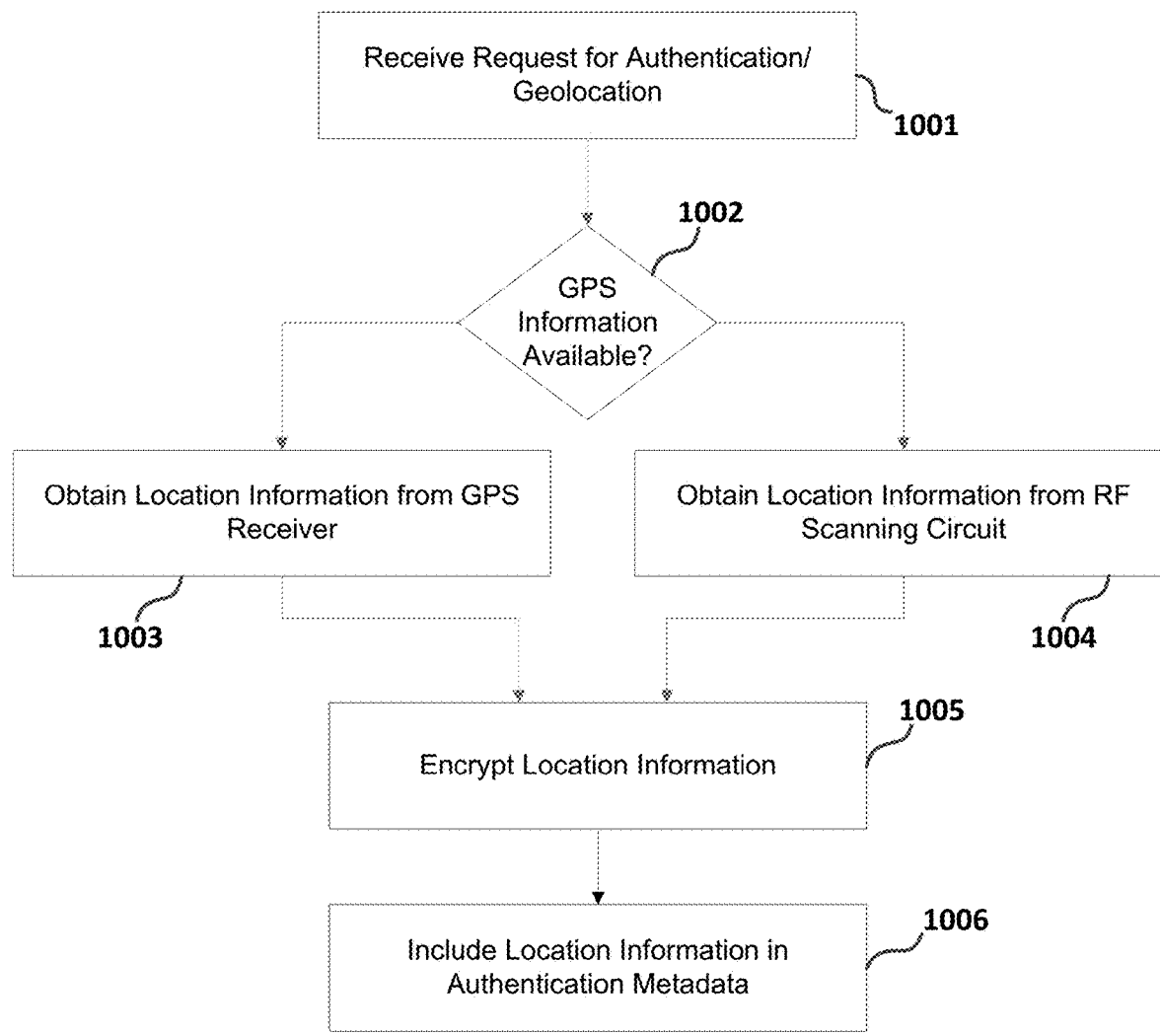
FIG. 10 depicts a flowchart for supporting authentication by the computing environments shown in FIGS. 1 and 5 in accordance with one or more example embodiments.

FIG. 10 depicts a flowchart for supporting authentication by geolocation dongle 900 in computing environments shown in FIGS. 1 and 5.

At block 1001, geolocation dongle 900 receives a request of geolocation information from computer 101 or 501 so that computer 101 or 501 can include the location information in authentication metadata to computing platform 102 or 502.

At block 1002 geolocation dongle 900 determines whether GPS location information is available from GPS receiver, If so, geolocation dongle 900 selects the GPS location information at block 1003. If not, geolocation dongle 900 will select location information derived from the surrounding cell towers at block 1004. In error situations where RF signals from surrounding cell towers are not available, location information cannot be provided to computer 101 or 501; consequently, authentication would typically be unsuccessful.

Geolocation dongle 900 may encrypt the location information at block 1005 to prevent location spoofing.

At block 1006 computer 101 or 501 obtains the location information from geolocation dongle 900 and includes the location information in authentication metadata to computing platform 102 or 502.

Figure 11:
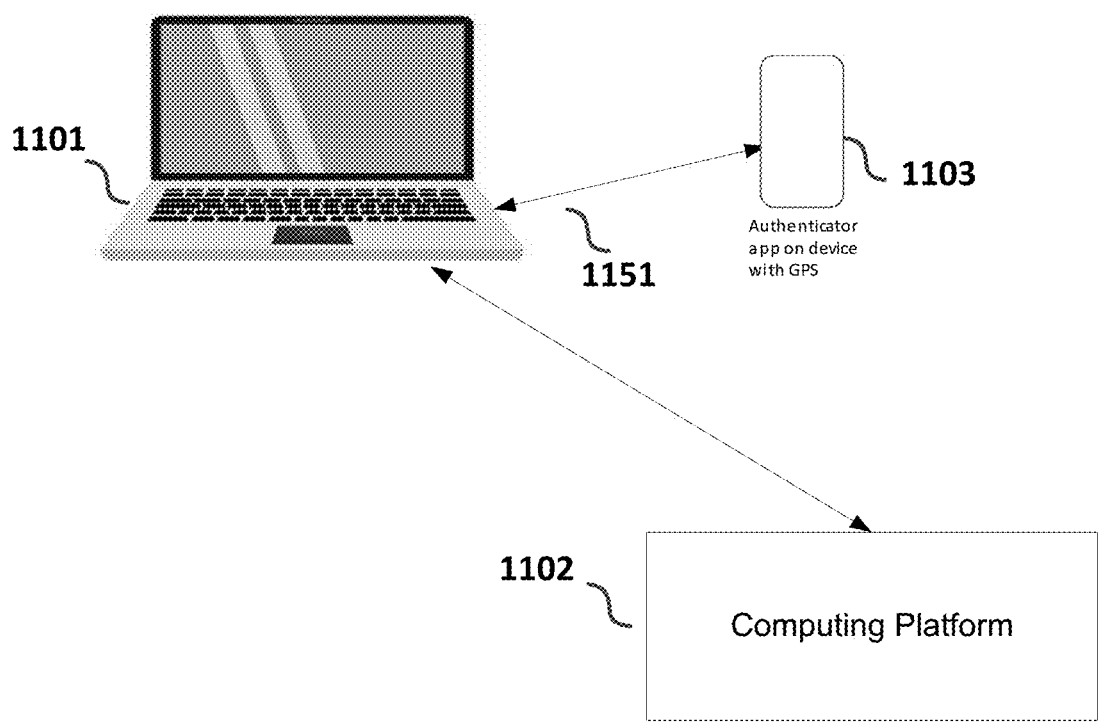
FIG. 11 depicts an illustrative computing environment for supporting authentication in accordance with one or more example embodiments.

FIG. 11 depicts an illustrative computing environment for supporting authentication, where a user at computer 1101 is interacting with computing platform 1102 during a communication session (for example, executing a transaction).

In order to validate the session, computing platform 1102 challenges the user to authenticate the session. The user may provide an authentication token (which may be obtained by the user via some means such as through another device not explicitly shown) as well as computing platform 1102 obtaining authentication metadata (which includes location information about computer 1101) from computer 1101.

With the embodiment shown in FIG. 11, computer 1101 obtains location information provided by associated communication device 1103, which contains a GPS device. Associated communication device 1103 (for example, a smart phone or a tablet) may execute an authenticator app to provide an authentication token as well as provide location information to computer 1101 over a short-range communication channel 1151 (for example, a Bluetooth channel). Because communication between computer 1101 and associated communication device 1103 is restricted in distance, the provided location information from associated communication device 1103 typically sufficient to identify the location of computer 1101 for the purposes of authentication.

Figure 12:
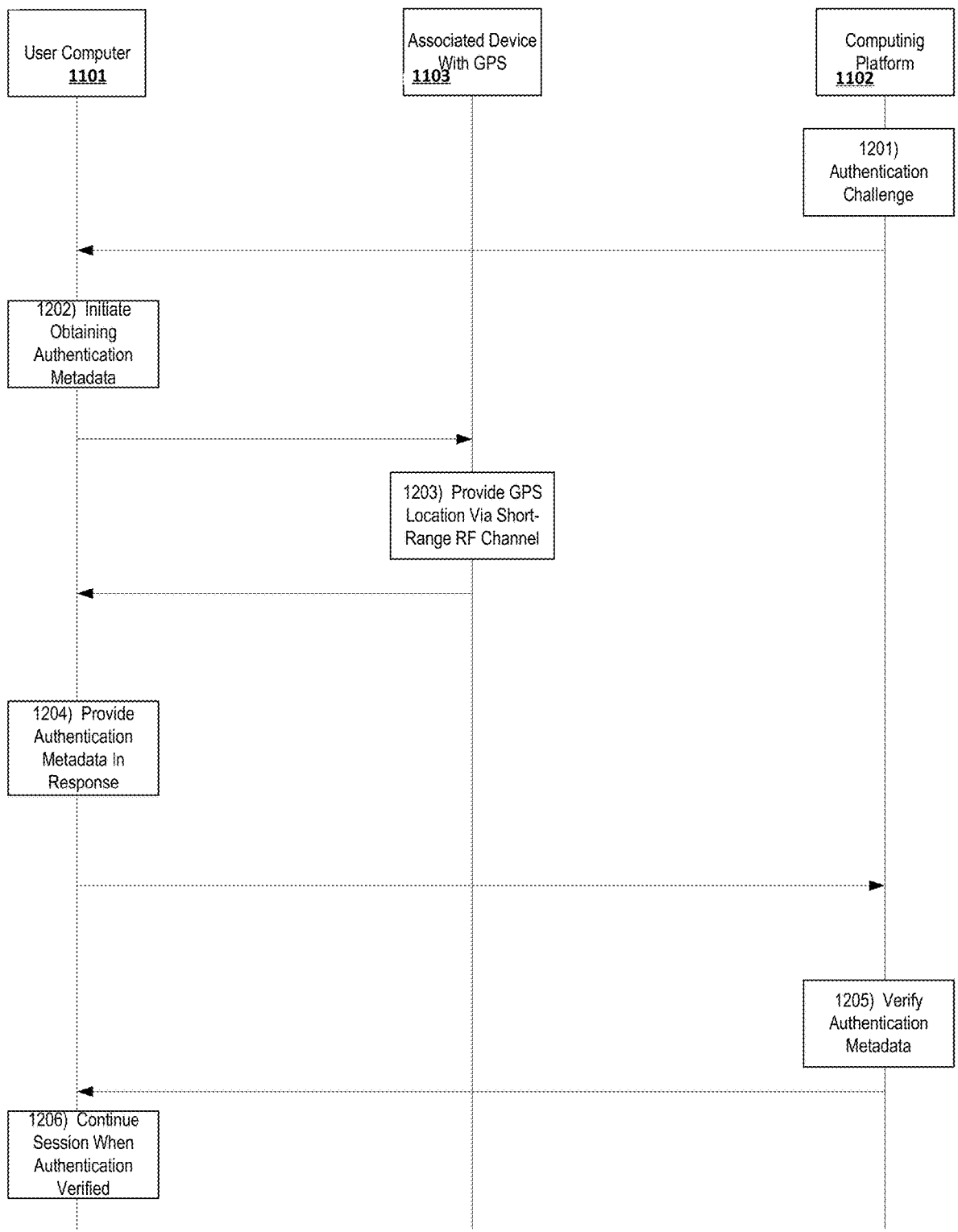
FIG. 12 depicts an illustrative event sequence for supporting authentication by the associated communication device shown in FIG. 11 in accordance with one or more example embodiments.

FIG. 12 depicts an illustrative event sequence for supporting authentication by associated communication device 1103 shown in FIG. 11.

At block 1201, computing platform 1102 challenges computer 1101. To successfully respond to the challenge, computer 101 must provide authentication metadata, including the location information, to computing platform 102.

At block 1202 computer 1101 initiates obtaining authentication metadata by requesting associated communication device 1103 over short-range communication channel 1151 to provide the location information. However, if communication with communication device 1103 cannot be established, computer 1101 is unable to obtain the location information and consequently authentication may not be successful.

At block 1203, associated communication device 1103 provides location via short-range communication channel 1151. With some embodiments, associated communication device 1103 may also provide an authentication token over the same short-range communication channel 1151.

At block 1204 computer 1101 provides the authentication metadata, including the location information, to computing platform 1102. If computing platform 102 deems that the authentication metadata is valid at block 1205, computer 1101 is allowed to continue interacting with computing platform 1102 during the communication session.

Figure 13:
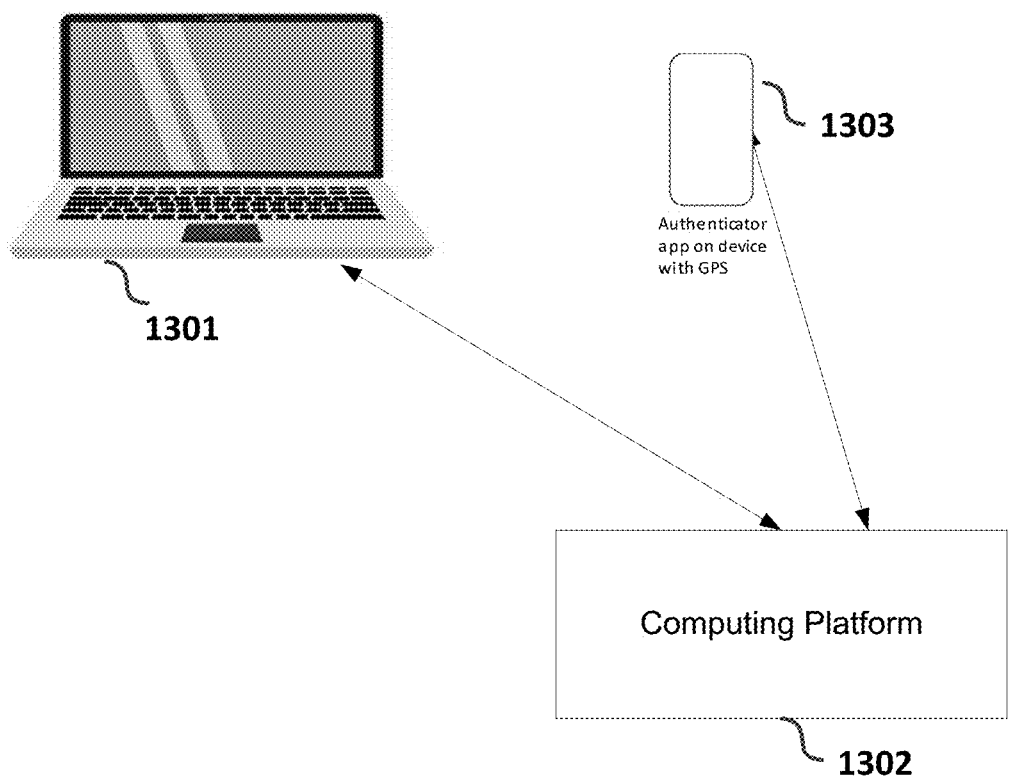
FIG. 13 depicts an illustrative computing environment for supporting authentication in accordance with one or more example embodiments.

FIG. 13 depicts an illustrative computing environment for supporting authentication, where a user at computer 1301 is interacting with computing platform 1302 during a communication session (for example, executing a transaction). The computing environment shown in FIG. 13 is similar to the computing environment shown in FIG. 11. However, associated communication device 1303 (which has GPS capabilities and is typically in the near vicinity of computer 1301) does not establish electronic communication with computer 1301 to provide location information. Rather, associated communication device 1303 provides its location information directly to computing platform 1302 via a communication channel, for example, through a cell service provider. Computing platform 1302 may link the location information with computer 1302 in a number of ways. For example, associated communication device 1303 may include a user id of computer 1301 when providing the location information.

Figure 14:
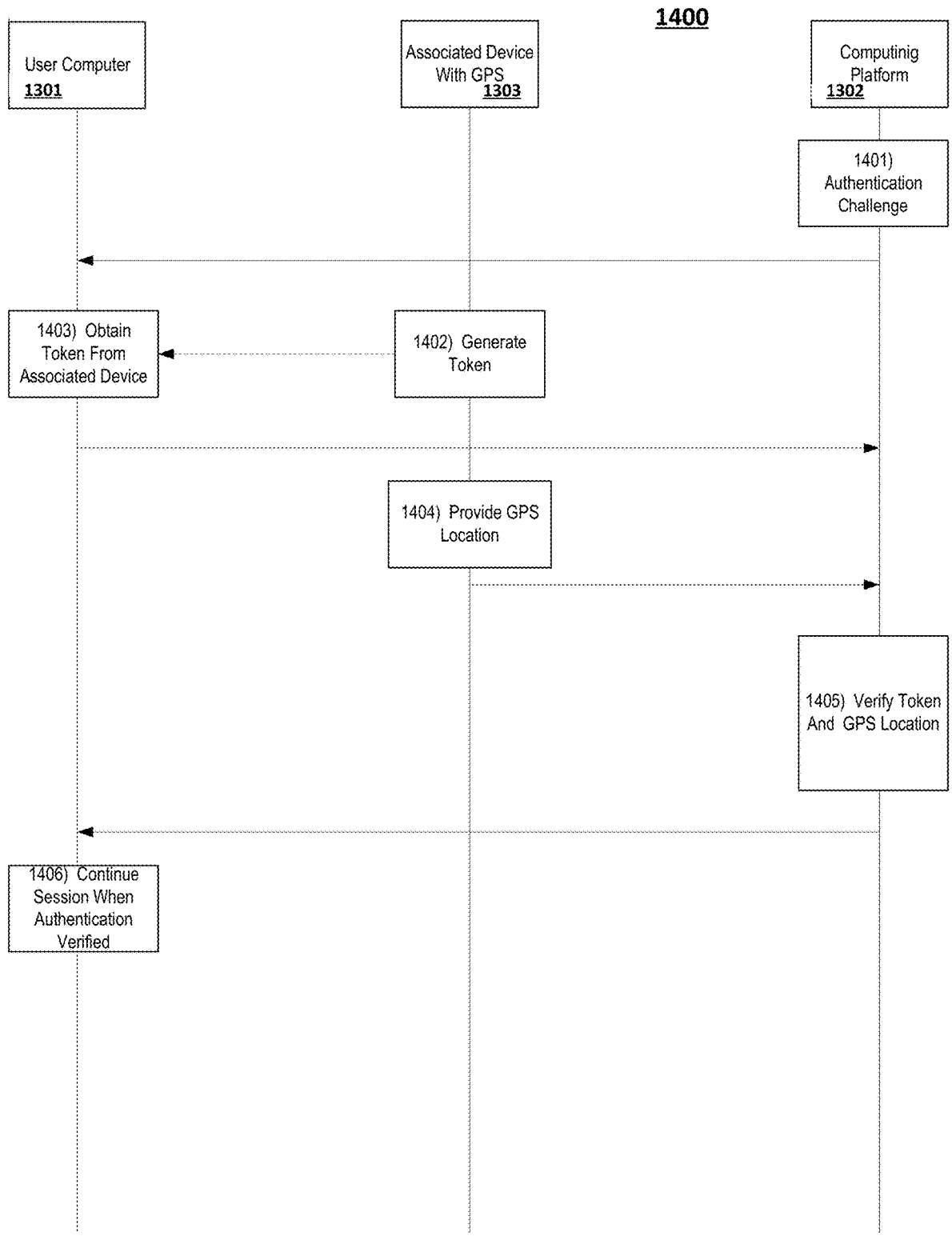
FIG. 14 depicts an illustrative event sequence for supporting authentication by the associated communication device shown in FIG. 13 in accordance with one or more example embodiments.

FIG. 14 depicts illustrative event sequence 1400 for supporting authentication by associated communication device 1303 shown in FIG. 13.

At block 1401, computing platform 1302 challenges computer 1301. To successfully respond to the challenge, computer 1301 must provide authentication metadata, including the location information, to computing platform 1302.

At block 1403 a user of computer 1301 obtains a token generated by associated communication device 1303 at block 1402. Because associated communication device 1303 may be in close proximity to computer 1301, the user may be able to visually see the token and enter it through computer 1301 during the communication session. In addition, associated communication device 1303 provides its GPS location information directly to computing platform 1302 at block 1404.

If computing platform 1302 verifies both the token and the location (along with other authentication metadata) at block 1405, computer 1301 is allowed to continue interacting with computing platform 1302 during the communication session at block 1406.

Figure 15:
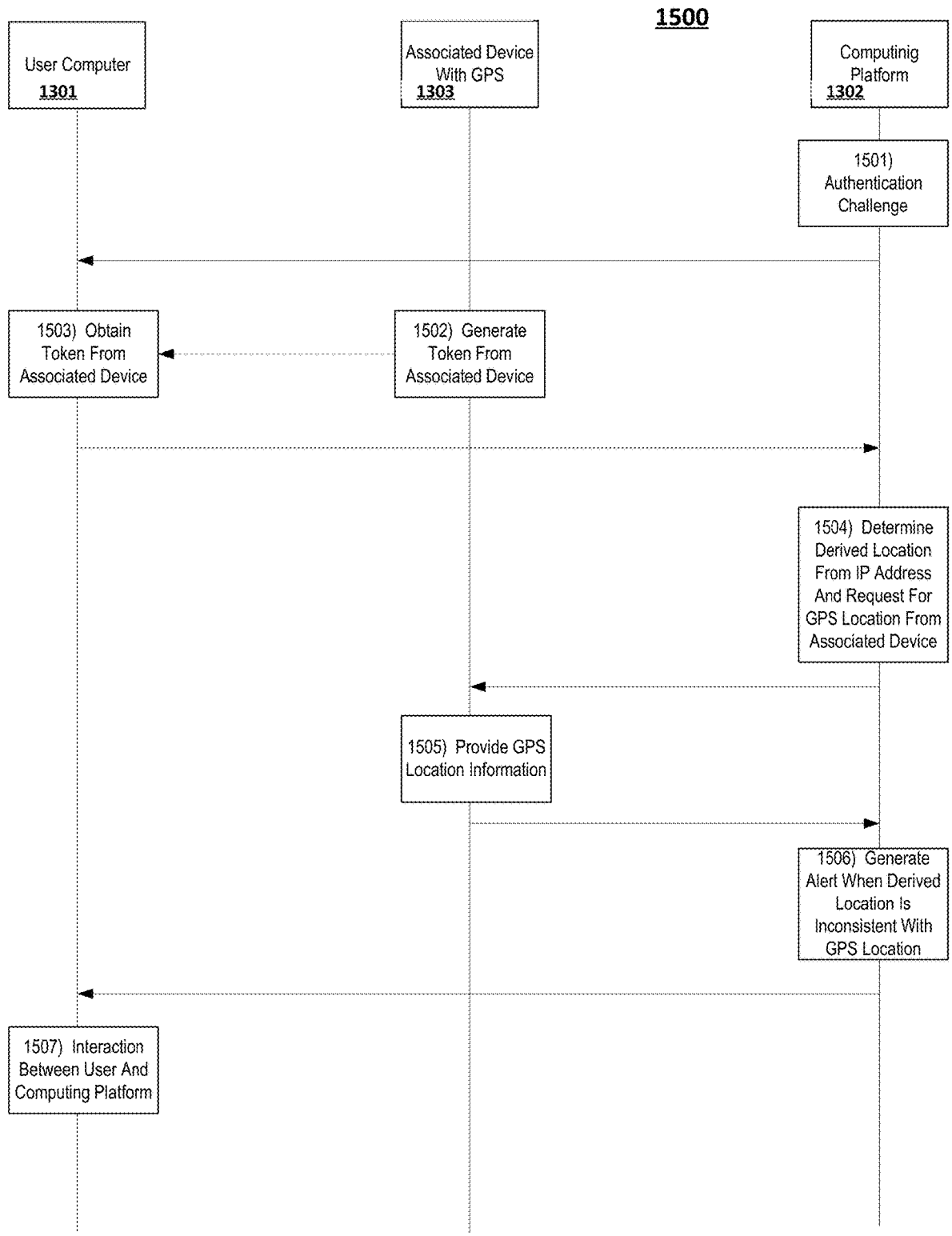
FIG. 15 depicts an illustrative event sequence for supporting authentication by the associated communication device shown in FIG. 13 in accordance with one or more example embodiments.

FIG. 15 depicts illustrative event sequence 1500 for supporting authentication by associated communication device 1303 shown in FIG. 13, where blocks 1401, 1402, and 1403 in sequence 1400 correspond to blocks 1501, 1502, and 1503, respectively. Sequence 1500 is similar to sequence 1400. However, sequence 1500 also derives the location corresponding to the assigned IP address of computer 1301.

At block 1504, computing platform 1302 determines the location from the assigned IP address, for example, from a database mapping IP addresses to locations. As previously discussed, the derived location may be incorrect in certain situations. To address this deficiency, computing platform 1302 requests that associated communication device 1303 (which presumably is in close proximity to computer 1301) provide its GPS location information, which associated communication device 1303 does at block 1505.

At block 1506, computing platform 1302 generates an alert signal when the derived location is sufficiently inconsistent with the GPS location provided by associated communication device 1303. For example, the derived location and the GPS location may be deemed to be consistent when the two locations are within a predetermined distance.

When an alert signal is generated, an interaction between the user of computer 1301 and computing platform 1302 occurs at block 1507.

Various aspects described herein may be embodied as a method, an apparatus, or as computer-executable instructions stored on one or more non-transitory and/or tangible computer-readable media. Accordingly, those aspects may take the form of an entirely hardware embodiment, an entirely software embodiment (which may or may not include firmware) stored on one or more non-transitory and/or tangible computer-readable media, or an embodiment combining software and hardware aspects. Any and/or all of the method steps described herein may be embodied in computer-executable instructions stored on a computer-readable medium, such as a non-transitory and/or tangible computer readable medium and/or a computer readable storage medium. Additionally or alternatively, any and/or all of the method steps described herein may be embodied in computer-readable instructions stored in the memory and/or other non-transitory and/or tangible storage medium of an apparatus that includes one or more processors, such that the apparatus is caused to perform such method steps when the one or more processors execute the computer-readable instructions. In addition, various signals representing data or events as described herein may be transferred between a source and a destination in the form of light and/or electromagnetic waves traveling through signal-conducting media such as metal wires, optical fibers, and/or wireless transmission media (for example, air and/or space).

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (for example, air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (for example, a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A geolocation dongle electrically attachable to a computer to enable the computer to support authentication during a communication session with a computing platform, the geolocation dongle comprising:
   at least one processor;
   a data interface communicatively coupled to the at least one processor to interact with the computer;
   a radio frequency (RF) monitoring circuit configured to monitor at least one RF signal and to provide processed information derived from the at least one RF signal;
   a cryptographic engine configured to encrypt unencrypted information based on an encryption key known at the computing platform and the geolocation dongle; and
   a memory device storing computer-readable instructions that, when executed by the at least one processor, cause the geolocation dongle to:
      receive a request for authentication metadata from the computer through the data interface, wherein the authentication metadata includes device characteristics of the computer and current location data;
      obtain the processed information from the RF monitoring circuit;
      derive location information from the processed information, wherein the location information is indicative of a current location of the geolocation dongle and the computer and is based on a signal strength of the at least one RF signal monitored by the RF monitoring circuit as compared to other RF signals monitored by the RF monitoring circuit;
      present the location information to the cryptographic engine to obtain encrypted location information; and
      provide, in response to the request for the authentication metadata, the encrypted location information and authentication metadata to the computer through the data interface.

2. The geolocation dongle of claim 1, wherein the RF monitoring circuit comprises an RF scanning device and wherein the memory device further causes the geolocation dongle to:

determine, by the RF scanning device, a nearest cell site to the computer based on a plurality of RF signals, wherein each RF signal of the plurality of RF signals is generated by a cell site;
determine the location information of the nearest cell site; and
approximate the current location of the computer by the location information of the nearest cell site.

3. The geolocation dongle of claim 2, wherein the memory device further causes the geolocation dongle to:
identify the nearest cell site from a strongest RF signal of the plurality of RF signals;
extract a cell identification (ID) from the strongest RF signal; and
determine the location information from the cell ID.

4. The geolocation dongle of claim 1, wherein the geolocation dongle includes the RF monitoring circuit and a Global Positioning System (GPS) receiver, and wherein the memory device further causes the geolocation dongle to:
provide, by the GPS receiver, the location information further based on a plurality of RF signals generated by the Global Positioning System, wherein the location information comprises longitudinal and latitudinal information about the geolocation dongle.

5. The geolocation dongle of claim 2, wherein the geolocation dongle comprises a location selection circuit and wherein the RF monitoring circuit comprises a Global Positioning System (GPS) receiver, wherein the memory device further causes the geolocation dongle to:
configure the location selection circuit to select the location information from one of: the GPS receiver or the RF scanning device.

6. The geolocation dongle of claim 5, wherein the memory device further causes the geolocation dongle to:
configure the location selection circuit to select the RF scanning device only when the GPS receiver is unable to provide the location information.

7. A method for supporting authentication between a computer and a computing platform during a communication session, the method comprising:
receiving, by the computer from the computing platform, an authentication challenge, wherein the computer is required to provide, in response to the authentication challenge, authentication metadata and wherein the authentication metadata comprises location information indicative of a current location of the computer as well as device characteristics of the computer;
in response to the receiving, requesting, by the computer and from an attached geolocation dongle, the location information;
in response to the requesting, obtaining by the attached geolocation dongle, processed information from a radio frequency (RF) monitoring circuit;
deriving location information from the processed information, wherein the location information is indicative of the current location of the attached geolocation dongle and is based on a signal strength of a plurality of RF signals monitored by the RF monitoring circuit;
presenting, in response to the request, the location information to the computer through a data interface;
including, by the computer, the location information in the authentication metadata; and
returning, by the computer to the computing platform in response to the authentication challenge, the authentication metadata including the location information and the device characteristics.

8. The method of claim 7 further comprising:
presenting the location information to a cryptographic engine to encrypt the location information based on an encryption key known at the computing platform and the attached geolocation dongle.

9. The method of claim 7, wherein the RF monitoring circuit comprises an RF scanning device, the method further comprising:
determining, by the RF scanning device, a nearest cell site to the computer based on the plurality of RF signals, wherein each RF signal of the plurality of RF signals is generated by a cell site;
determining the location information of the nearest cell site; and
approximating a current location of the computer by the location information of the nearest cell site.

10. The method of claim 9 further comprising:
determining, by the RF scanning device, a strongest RF signal one of the plurality of RF signals;
extracting a cell identification (ID) from the strongest RF signal; and
determining the location information from the cell ID.

11. The method of claim 10, wherein the RF monitoring circuit comprises a Global Positioning System (GPS) receiver, the method further comprising:
configuring a location selection circuit to select the location information from one of; the GPS receiver or the RF scanning device.

12. The method of claim 11 further comprising:
configuring the location selection circuit to select the RF scanning device only when the GPS receiver is unable to provide the location information.

13. The method of claim 7, wherein the RF monitoring circuit comprises a Global Positioning System (GPS) receiver, the method further comprising:
providing, by the GPS receiver, the location information is further based on a plurality of RF signals generated by the Global Positioning System, wherein the location information comprises longitudinal and latitudinal information about the geolocation dongle.

14. A method for supporting authentication between a computer and a computing platform during a communication session, the method comprising:
receiving, by the computer from the computing platform, an authentication challenge, wherein the computer is required to provide, in response to the authentication challenge, authentication metadata and wherein the authentication metadata comprises location information indicative of a current location of the computer as well as device characteristics of the computer;
establishing communication, by the computer to an associated communication device via a short-range communication channel;
obtaining, by the computer from the associated communication device via the short-range communication channel, location information, wherein the location information is indicative of a current location of the associated communication device and wherein the location information is based on a signal strength of a plurality of radio frequency (RF) signals monitored by an RF monitoring circuit;
including, by the computer, the location information in the authentication metadata; and
returning, by the computer to the computing platform in response to the authentication challenge, the authentication metadata including the location information and the device characteristics.

15. The method of claim 14, wherein the short-range communication channel comprises a Bluetooth channel.

16. A method for supporting authentication between a computer and a computing platform during a communication session, wherein a communication device is associated with the computer, the method comprising:
receiving, by the computer from the computing platform, an authentication challenge, wherein the computer is required to provide, in response to the authentication challenge, an authentication token;
obtaining, by the computer from the communication device, the authentication token;
sending, by the computer to the computing platform, the authentication token;
obtaining, by the computing platform from the communication device, location information, wherein the location information is indicative of a current location of the communication device, wherein the location information is based on a signal strength of a plurality of radio frequency (RF) signals;
determining, by the computing platform, whether the location information is consistent for the computer, wherein a first distance between a known approximate location of the computer and the current location of the communication device is less than a first predetermined threshold; and
when the location information is consistent and the authentication token are valid, continuing the communication session between the computer and the computing platform.

17. The method of claim 16 further comprising:
determining, by the computing platform, a derived location of the computer further based on an assigned IP address of the computer; and
when the derived location is inconsistent with the location information provided by the communication device, generating an alert notification-, by the computing platform, wherein a second distance between the derived location and the current location of the communication device is greater than a second predetermined threshold and wherein the alert notification is indicative of an interaction between a user of the computer and the computing platform.

18. One or more non-transitory computer-readable media storing instructions that, when executed by a geolocation dongle comprising at least one processor, and memory, cause the geolocation dongle to:
receive a request for authentication metadata from an attached computer, wherein the attached computer has established a communication session with a computing platform;
in response to the receiving, obtain processed information from a radio frequency (RF) monitoring circuit;
derive location information from the processed information, wherein the location information is indicative of a current location of the geolocation dongle and is based on a signal strength of a plurality of RF signals monitored by the RF monitoring circuit;
encrypt the location information to form encrypted location information based on an encryption key, wherein the encryption key is known to the geolocation dongle and the computing platform; and
present, in response to the request, the encrypted location information to the computer.

19. The one or more non-transitory computer-readable media of claim 18, wherein the instructions, when executed by a geolocation dongle, further cause the geolocation dongle to:
determine a strongest RF signal one of the plurality of RF signals;
extract a cell identification (ID) from the strongest RF signal; and
determine the location information from the cell ID.

20. The one or more non-transitory computer-readable media of claim 18, wherein the instructions, when executed by a geolocation dongle, further cause the geolocation dongle to:
obtain further location information from a Global Positioning System (GPS) receiver, wherein the location information comprises longitudinal and latitudinal information about the geolocation dongle.

* * * * *